United States Patent [19]

Cody

[11] Patent Number: 4,515,681

[45] Date of Patent: May 7, 1985

[54] CATALYTIC DEWAXING USING COLLAPSED LARGE PORE ZEOLITES

[75] Inventor: Ian A. Cody, Baton Rouge, La.

[73] Assignee: Exxon Research & Engineering Co., Florham Park, N.J.

[21] Appl. No.: 416,092

[22] Filed: Sep. 8, 1982

[51] Int. Cl.$^3$ ............................................. C10G 47/16
[52] U.S. Cl. ........................................ 208/111; 502/79
[58] Field of Search ..................... 208/111; 502/75, 79

[56] References Cited

U.S. PATENT DOCUMENTS

| | | | |
|---|---|---|---|
| 3,140,251 | 7/1964 | Plank et al. | 502/79 X |
| 3,173,854 | 3/1965 | Eastwood et al. | 208/111 |
| 3,304,254 | 2/1967 | Eastwood et al. | 208/111 |
| 3,354,077 | 11/1967 | Hansford | 208/111 |
| 3,364,150 | 1/1968 | Hughes | 208/111 |
| 3,391,075 | 7/1968 | Plank et al. | 208/111 |
| 3,402,996 | 9/1968 | Maher et al. | 423/328 X |
| 3,438,887 | 4/1969 | Morris et al. | 208/87 |
| 3,442,794 | 5/1969 | Van Helden et al. | 208/111 |
| 3,617,485 | 11/1971 | Kittrell | 208/59 |
| 3,629,096 | 12/1971 | Divtjak | 208/89 |
| 3,644,200 | 2/1972 | Young | 208/138 X |
| 3,717,588 | 2/1973 | Alexander et al. | 252/455 R |
| 3,725,243 | 4/1973 | Haas et al. | 208/59 |
| 3,749,663 | 7/1973 | Mickelson | 208/110 |
| 3,749,664 | 7/1973 | Mickelson | 208/254 H |
| 3,755,150 | 8/1973 | Mickelson | 208/216 |
| 3,755,196 | 8/1973 | Mickelson | 252/435 |
| 3,764,516 | 10/1973 | Steinmetz | 208/27 |
| 3,769,235 | 10/1973 | White et al. | 252/455 R |
| 3,835,027 | 9/1974 | Ward | 208/111 |
| 3,897,327 | 7/1975 | Ward | 208/111 |
| 3,929,617 | 12/1975 | Henry et al. | 208/96 |
| 3,945,943 | 3/1976 | Ward | 252/455 Z |
| 3,962,364 | 6/1976 | Young | 252/437 X |
| 4,003,825 | 1/1977 | Mitchell et al. | 208/120 |
| 4,028,224 | 6/1977 | MacDonald et al. | 208/92 |
| 4,089,775 | 5/1978 | Berger et al. | 208/111 |
| 4,149,960 | 4/1979 | Garwood et al. | 208/111 |
| 4,259,174 | 3/1981 | Chen et al. | 208/111 |
| 4,439,310 | 3/1984 | Audeh et al. | 208/111 |

FOREIGN PATENT DOCUMENTS

| | | |
|---|---|---|
| 883804 | 10/1971 | Canada ............................ 208/111 |
| 2455319 | 11/1973 | Fed. Rep. of Germany . |
| 1323710 | 7/1973 | United Kingdom . |
| 1465842 | 3/1977 | United Kingdom . |
| 2085861 | 5/1982 | United Kingdom . |

OTHER PUBLICATIONS

J. Cat. 27, 157–161 (1972) Ward, "Thermal Decomposition of Ammonium Y Zeolite".
J. Cat. 27, 161–163 (1972) Jacobs & Uytterhoeven, "Thermal Decomposition of Ammonium Y Zeolite, A Reply to John W. Ward".
J. Cat. 38, 469–476 (1975) Kuhl et al., "Structural Stability of Sodium Ammonium Z".
J.C.S. Faraday I, 71, 1777–1783 (1975) Guilleux et al., "Spectroscopic Study of Surface Properties of Various $NH_4$-Exchanged X Zeolite".
J. Cat. 15, 200–204 (1969), Kerr, "Chemistry of Crystalline Aluminosilicates".
"New Developments in Catalytic Cracking", Eastwood et al., Proc. Eighth World Pet. Cong. 4, 245 (1971).
"Acidic Crystalline Aluminosilicates", Plank et al., Ind. & Eng. Chem. Prod. Res. Div., vol. 3, Sep. 1964, pp. 165–169.
"Effect of Platinum on the Constraint Index of ZSM-5 Zeolite", Guisnet et al., J. Chem. Soc. Chem. Commun., 1411–1412, 1983.

*Primary Examiner*—Delbert E. Gantz
*Assistant Examiner*—Lance Johnson
*Attorney, Agent, or Firm*—Joseph J. Allocca

[57] ABSTRACT

It has been discovered that the pour point and wax content of waxy hydrocarbon oils, either natural or derived from synthetic sources such as tar sands, shale oil, etc., preferably natural waxy petroleum oils, most preferably waxy lube, transformer, specialty oils and waxy fuels such as kerosene or jet fuel, can be effectively reduced under standard catalytic dewaxing conditions using an aluminosilicate catalyst with very low crystallinity (VLC), as measured by x-ray diffraction. These VLC materials are derived from crystalline aluminosilicate zeolites which will not themselves reduce the pour point and wax content of waxy oils by the thermal decomposition of said zeolites following their exchange with cations which yield hydroxyl groups during the thermal decomposition step.

31 Claims, 1 Drawing Figure

A) CATALYST D, .25% Pd NH₄⁺ FORM

B) CATALYST D, AFTER DRY AIR CALCINATION AT 450°C

C) CATALYST D, AFTER HEATING IN H₂ AT 450°C AND 30 HOURS ON OIL

2θ DEGREES

CATALYTIC DEWAXING USING COLLAPSED LARGE PORE ZEOLITES

DESCRIPTION OF THE INVENTION

It has been discovered that the pour point and wax content of waxy hydrocarbon oils, either natural or derived from synthetic sources such as tar sands, shale oil, etc., preferably natural waxy petroleum oils, most preferably waxy lube, transformer, specialty oils and waxy fuels such as kerosene or jet fuel, can be effectively reduced under standard catalytic dewaxing conditions using an aluminosilicate catalyst with very low crystallinity (VLC), as measured by x-ray diffraction. These VLC materials are derived from crystalline aluminosilicate zeolites which will not themselves reduce the pour point and wax content of waxy oils by the thermal decomposition of said zeolites following their exchange with cations which yield hydroxyl groups during the thermal decomposition step. The VLC material used as the catalyst is preferably prepared by the steps of:

a. exchanging the original cations in the zeolites with cations which can be thermally decomposed into hydroxyl groups;

b. drying the exchanged zeolite to remove excess moisture;

c. calcining in a relatively dry atmosphere containing, e.g., less than about 1 psi, preferably less than 0.2 psi water vapor partial pressure, most preferably a dry atmosphere so as to reduce crystallinity to 50% or less compared with the zeolitic starting material.

If further crystallinity reduction is required to reach the preferred desired level of 15% or less crystallinity (by XRD) (explained in greater detail below) then the material of (c) is dry roasted in a non-reactive or reducing atmosphere or in a vacuum. Preferably, the material of (c) is exposed to moisture upon cooling prior to the dry roasting step. If the material is metal loaded the roasting is preferably conducted in a reducing atmosphere.

Some crystalline zeolites are known to reduce the wax content and pour point of waxy hydrocarbon oils by a process hereinafter referred to as catalytic dewaxing. Such zeolites, like ZSM-5 and offretite, have nominal pore sizes, typically in the range 5 to 6.5 Å, which is sufficiently small to exclude most molecules with branches or ring components, but large enough to admit molecular species with few or no branches or rings—the paraffin waxes. Having entered the pores, waxes may be converted to lower boiling fragments over active zeolitic sites to render a lower pour point, lower wax content (dewaxed) oil.

Zeolites with smaller or larger pores than 5 to 6.5 Å are not known to behave as dewaxing catalysts either because the pore is too small to adsorb paraffin waxes or it is too large, so that a wide variety of hydrocarbon species can enter, including branched and ring containing molecules which make up the oil itself. In the latter case conversion may occur but will not be selective for paraffin wax and therefore any residual oil will not have a reduced pour point or wax content.

The discovery disclosed here demonstrates that large pore crystalline zeolites which do not lower pour points or reduce wax contents of waxy hydrocarbons can be made to behave as if they were intermediate pore crystalline zeolites.

This is done by thermally transforming the zeolite from a fully crystalline structure to a material with very low crystallinity (VLC) as measured by x-ray diffraction. For the purposes of this specification, VLC materials are described as being about 50% crystalline or less, but lower levels of crystallinity are preferred, preferably about 15% crystalline or less, when compared with the zeolitic starting material, and more preferably less than about 10%, and most preferably about 5 to 0% crystalline.

This is an unexpected finding because very low crystallinity (or amorphous) materials have not previously been known to distinguish molecules on the basis of their shape.

Zeolites which may be converted from the crystalline form into very low crystallinity material suitable for hydrocarbon dewaxing are those having relatively low $SiO_2/Al_2O_3$ ratios, typically about 6 or less and large pore sizes, about 7 Å or greater. Examples of crystalline materials which can be transformed into very low crystallinity aluminosilicate catalysts for hydrocarbon dewaxing are Zeolite Y and Zeolite X. These zeolites may be anywhere from about 50% to 100% crystalline and are as such categorized for the purpose of the specification as crystalline. These crystalline zeolite materials indiscriminantly convert both desired oil molecules as well as the undesirable wax molecules when a waxy hydrocarbon is contacted with them at standard catalytic dewaxing conditions. As large pore crystalline zeolites they are unattractive as catalysts for hydrocarbon dewaxing processes.

However, they can be transformed into materials useful for hydrocarbon dewaxing/pour point reduction by their conversion from the crystalline to the very low crystallinity form via thermal decomposition as outlined above.

THE INVENTION

Figure 1:
FIG. 1 (A, B, C) presents the XRD patterns for catalyst material D from the examples showing crystallinity loss.
Figure 1:
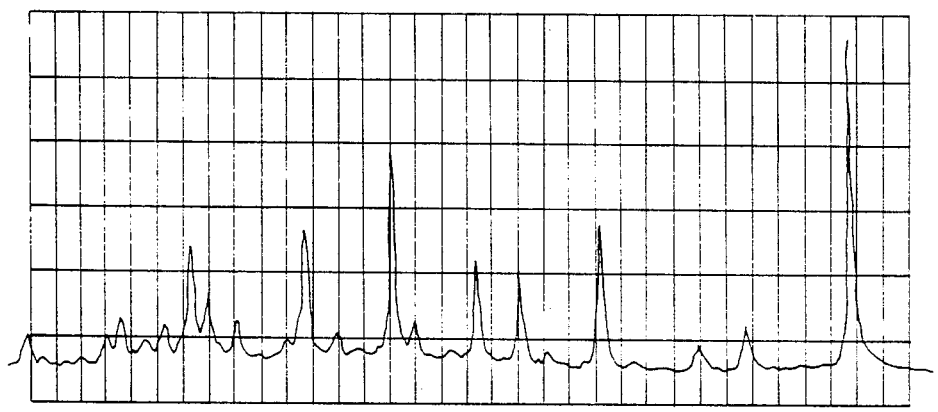
Figure 1:
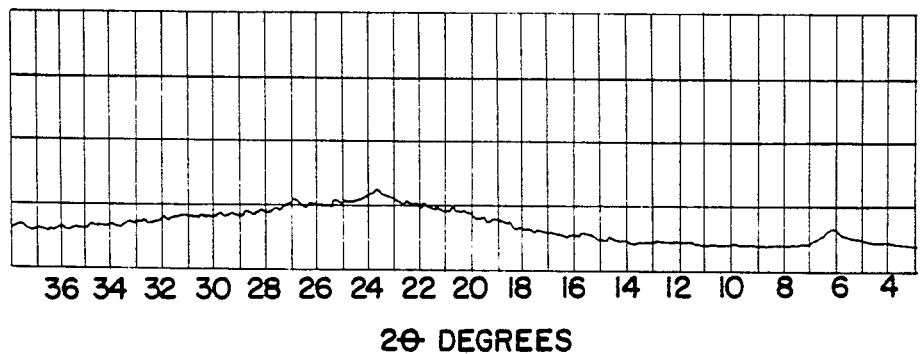

It has been discovered that the pour point and wax content of waxy hydrocarbon oils, either natural or derived from synthetic sources such as tar sands, shale oil, etc., preferably natural waxy petroleum oils, most preferably waxy lube, transformer, specialty oils and waxy fuels such as kerosene or jet fuel, can be effectively reduced under standard catalytic dewaxing conditions using an aluminosilicate catalyst with very low crystallinity (VLC) as measured by x-ray diffraction. These VLC materials are derived from crystalline aluminosilicate zeolites which will not themselves reduce either the pour point or wax content of waxy oils by the thermal decomposition of said zeolites following their exchange with cations which yield hydroxyl groups during the thermal decomposition step. The VLC material used as the catalyst is preferably prepared by the steps of:

a. exchanging the original cations in the zeolites with cations whih can be thermally decomposed into hydroxyl groups;

b. drying the exchanged zeolite to remove excess moisture;

c. calcining in a relatively dry atmosphere containing, e.g., less than about 1 psi, preferably less than 0.2 psi water vapor partial pressure, most preferably a dry atmosphere so as to reduce crystallinity to 50% or less compared with the zeolitic starting material.

If further crystallinity reduction is required to reach the preferred desired level of 15% or less crystallinity (by XRD) then the material of (c) is dry roasted in a non-reactive or reducing atmosphere or in a vacuum. Preferably the material of (c) is first exposed to moisture upon cooling prior to the dry roasting step. If the material is metal loaded the roasting is preferably conducted in a reducing atmosphere.

Cation exchange, the first step in converting the crystalline zeolite into the very low crystallinity material, may be conducted using any of the procedures common to those skilled in the art, but it is important that the exchanging ion be susceptible to thermal decomposition to yield a hydroxylic form of the zeolite. Illustrative of compounds suitable for this exchange step are the organic and inorganic ammonium salts such as ammonium halides, e.g., chlorides, bromides, ammonium carbonates, ammonium thiocyanate, ammonium hydroxide, ammonium molybdate, ammonium dithionate, ammonium nitrate, ammonium sulfate, ammonium formate, ammonium lactate, ammonium tartrate and the like. Other suitable exchange compounds include hydrocarbon and organic amines such as the class of organic nitrogen bases including pyridene, guanidine and quinoline salts. Another class of organic compounds includes the complex polyhydrocarbyl ammonium salts, e.g., the tetraalkyl and tetraaryl salts such as tetramethylammonium hydroxide and tetraethylammonium hydroxide. However, it is preferred that the ion be ammonium ion and that it be introduced by ion exchange with an inorganic ammonium salt such as ammonium nitrate or ammonium sulfate, preferably ammonium nitrate. It has been found that a relatively extensive cation exchange is preferred, i.e., greater than about 50% exchange, preferably greater than about 60%, and most preferably greater than 70% exchange depending upon the zeolite treated. For zeolite Y cation exchange of greater than about 60% should be used to generate the VLC material which is the desired material of the present invention. It has been found that at exchanges of 50% or less the crystalline zeolite does not convert into the catalytically selective very low crystallinity material which is the desired material of the present invention.

The cation exchanged zeolite should be relatively dry prior to the calcination step so as to avoid inadvertent steaming during the calcination step. Absolute dryness is not essential, but the sample should contain no more than an equilibrium amount of moisture following exposure to ambient atmosphere conditions. Sample drying to the previously recited level of dryness may take the form of permitting the sample to evaporate most of its moisture off into the atmosphere, but preferably deliberate drying is practiced, for example, heating to about 120° C. for about an hour or more depending on sample size, or pumping off the moisture by application of a vacuum, etc.

The exchanged relatively dry zeolite is then calcined. This calcining may be conducted in air, hydrogen or any gas which is inert, i.e., does not interact with the zeolite. The atmosphere employed may contain moisture, e.g., less than 1 psi water vapor partial pressure, but preferably less than about 0.2 psi water vapor partial pressure in the gas employed at the conditions used. Too high a water vapor partial pressure is not desirable since it can cause the zeolite structure to stabilize and not collapse. This phenomenum is known in the art as "steaming". [See Ward, U.S. Pat. No. 3,945,943, U.S. Pat. No. 3,897,327 and J. Cat. 27, 157–161 (1972).] Air containing ambient atmospheric moisture may be conveniently used. However, while calcination in air containing moisture is permissible, it is most preferable to calcine in a dry atmosphere (i.e., an atmosphere containing no more than trace amounts of moisture). Such calcination is conducted at a temperature of at least 300° C., preferably 300° to 600° C., for a time sufficient for the entire sample to reach the temperature. The sample can be inserted into a preheated oven or furnace or can be brought up to temperature gradually, i.e., 30°–60° C./min. or more, preferably 40° C./min. or more. Very high heating rates are preferred since the object is to degrade zeolitic structure. This calcination reduces the crystallinity of the zeolite to 50% or less crystalline, amd may in some instances yield the VLC material having the preferred level of 15% or less crystallinity (i.e., the preferred VLC material for use in this process).

If further crystallinity reduction is required after the above recited calcination step so as to reach the more desired level of 15% or less crystallinity by XRD, this may be achieved by one of two routes. The material may be roasted at a temperature higher than the previous calcination, in a dry atmosphere, e.g., inert-nonreactive or reducing atmosphere containing no more than trace amounts of moisture, or in a vacuum, at from 600° C. to 900° C. so as to further reduce the crystallinity of the material. Alternatively and preferably the calcined material is exposed to moisture upon cooling (i.e., during or after cooling) to below about 300° C., preferably to ambient temperature, so as to allow an equilibrium amount of moisture to adsorb onto the material. A moist atmosphere satisfying the requirements for this purpose is an atmosphere containing up to the saturation vapor pressure of water in the atmosphere. Moist laboratory air is an effective moist atmosphere for this purpose. The sample is then subsequently roasted in an inert-nonreactive, or reducing atmosphere, or in a vacuum. This roasting is conducted for at least one hour at temperatures of from 300° C. to 900° C., preferably 350° C. to 600° C., most preferably 400° C. to 550° C.

Preferably, roasting is conducted in a dry reducing atmosphere, most preferably hydrogen or a hydrogen containing reducing atmosphere. Such roasting may be performed by either inserting the material directly into a preheated oven or furnace or, preferably, by slowly bringing the material to the desired temperature (and holding there). If the material is metal loaded (as described below), it is preferable to bring the material to the desired final temperature at a slow rate of heating. The process sequence of cooling in a moist atmosphere and roasting in a dry atmosphere facilitates crystallinity loss more readily than roasting in a dry environment alone, leading to the desired VLC material (i.e., preferred crystallinity level of 15% or less) and is believed to also result in the generation of a more active catalyst.

The waxy hydrocarbon oil dewaxing/pour point reduction process of the present invention employs the very low crystallinity material described herein either as is, or in combination with at least one added catalytic component such as hydrogenation components from Group IVB through Group VIII metal, oxide, sulfide, and mixtures thereof, from the Periodic Table of the Elements. Preferably, the catalytic component (in the elemental metal form or as the oxide or sulfide, or mixtures thereof) is selected from Group VIII, most preferably Pd, Pt and Ni.

These catalytic metal components may be incorporated into the VLC material after preparation, but preferably the metal component is incorporated into the crystalline zeolite prior to that material being transformed into the very low crystallinity form. Regardless of whether the catalytic metal is incorporated into the crystalline zeolite prior to conversion into the very low crystallinity form, or is incorporated into the VLC material after conversion, the incorporation may be done by any of the methods commonly employed, i.e., incipient wetness, immersion in aqueous or in non-aqueous solvent systems containing cationic metal salts. Metal loading may range from 0% to 5% by weight, preferably 0.2 wt.% to 1.0 wt.%, most preferably 0.2 wt.% to 0.5 wt.%.

The VLC material can be combined with other materials such as clays, binders, extenders, alumina, silica, carbon, etc. and can be used as such or extruded, pilled, granulated, etc.

In practicing the dewaxing/pour point reduction process, the waxy hydrocarbon oil, preferably a waxy petroleum oil, more preferably a waxy distillate, of the lube transformer, diesel, jet fuel, white oil or other specialty oil type, derived from both natural and synthetic sources (i.e., synthetic oils such as tar sand oils, coal derived oils, shale oils, etc.) is contacted with the VLC material under conditions of temperature, pressure, hydrogen flow, flow velocity (residence time), etc. which are commonly employed in catalytic hydrodewaxing processes. Typically the catalyst will be employed at a temperature in the range of 250° C. to 450° C. at a hydrogen partial pressure of 300 to 1,500 psig $H_2$ (2.1 to 10.4M Pag $H_2$) and at a space velocity of from 0.1 to 10.0 V/H/V. The catalyst will operate in any of the typical bed/flow modes, including fixed bed trickle flow mode fluidized bed mode and/or cocurrent and counter-current flow conditions. The most suitable operation, however, would be in the fixed bed trickle flow mode.

The preferred VLC materials for the dewaxing/pour point reduction process are those derived from Zeolite Y, Zeolite X and other faujasite type zeolites, but most preferably zeolite y and xeolite x, hereinafter identified as VLC Y and VLC X.

Crystalline H form Zeolite Y is commonly used in hydroprocessing because it is very acidic and has large pores, about 10 Å, which allow the entry of many molecules of varying types and sizes. H form Zeolite Y is a very active hydrocracking catalyst, but is not a good dewaxing/pour point reduction catalyst. After Zeolite Y is converted into VLC Y, the VLC Y behaves in a manner normally associated with the intermediate pore size crystalline structures with respect to catalytic dewaxing/pour point reduction of waxy hydrocarbon oils.

Typically, then this procedure would require, for example, that Na Zeolite Y be deeply exchanged with $NH_4^+$ solutions to below Na/Al (atom ratio)=0.5 and preferably below Na/Al=0.3. The ammonium form zeolite should then be dried (i.e., have excess moisture driven off) at about 120° C. for about 1 hour in an oven and cooled to ambient temperature.

The $NH_4^+$ form zeolite could then be calcined in a dry environment, usually in dry air (i.e., containing no more than trace amounts of moisture) at a temperature sufficient to satisfactorily reduce crystallinity to 50% (by XRD) and preferably lower. Calcining temperatures of preferably 400° C. to 500° C. will achieve this but it is important that the heating step is preferably performed so that the temperature of the sample rises rapidly and preferably that any moisture or gases evolving from the sample are swept from the surface. The sample should reach the temperature of the furnace within about 15 minutes, but heating is conducted for a time sufficient for the entire sample to reach the final temperature. An acceptable procedure is to place a thinly spread layer of zeolite onto a fine wire mesh tray directly from room temperature air into the preheated, dry air purged muffle furnace.

The factors governing dryness during this step are the size of the furnace relative to sample size, the moisture content in the purge, and the rate of purge. An acceptable level of dryness and rate of purge are determined by the resulting crystallinity loss. A most effective way to destroy structure, in the manner suitable for the practice of this invention, is to use dry cylinder air as the purging gas. This step is to be clearly distinguished from "steaming" which has been used to stabilize the structure of Zeolite Y while increasing its $SiO_2/Al_2O_3$ modulus. John W. Ward has noted the differences between $NH_4^+$ form Zeolite Y samples, which were calcined in steam and calcined in dry air (J. Catalysis, supra) and reports that the steam calcined samples had a higher degree of crystallinity, the dry air calcined samples being reported as having zero crystallinity. Clearly, if samples are heated in too humid an atmosphere or at a low purge rate in dry air, crystallinity tends to be retained. Methods which stabilize the structure, like steaming and deep bed air calcination wherein moisture is trapped in the sample bed during heating (see: G. T. Kerr, J. Catalysis, 15, 200 [1969]), are not desirable.

After about one hour calcination in a dry atmosphere (e.g. in dry air) the preferable sample should be removed from the hot muffle furnace and cooled to room temperature in moist laboratory air. The calcined material is exposed to the moist atmosphere, either during or after cooling, preferably during cooling.

Finally, this hydrated sample should again be heated in a dry environment up to at least 400° C. and preferably 450° C. (roasting). Since the catalyst will subsequently be operating in a hydrogen atmosphere it is preferable that the final roasting step also be performed in hydrogen, but any dry inert atmosphere, or even vacuum, may be employed.

EXAMPLES

In the Examples below, five catalysts were prepared from the same base but were activated in different ways and consequently performed differently on a Western Canadian 600N raffinate (oil inspection Table 1).

TABLE 1

| FEEDSTOCK INSPECTIONS WESTERN CANADIAN 600N ||
|---|---|
| Density at 15° C. | 0.874 |
| Refractive Index at 60° C. | 1.4672 |
| Basic Nitrogen, ppm | 14 |
| Sulfur wt. % | 0.16 |
| Pour Point, °C. | 50 |
| GCD, °C. at % off | |
| 5 | 412 |
| 10 | 451 |
| 30 | 476 |
| 50 | 498 |
| 70 | 522 |
| 90 | 541 |
| 95 | 556 |

TABLE 1-continued

| FEEDSTOCK INSPECTIONS WESTERN CANADIAN 600N | |
|---|---|
| Wax Content wt. % (1) | 17.1 |

(1) Calculated for product filtered at −5° C. from 1:1 MEK/MIBK at 2:1 solvent:oil The Examples indicate that a specific procedure must be followed in order to render the zeolite (in this case Zeolite Y) into an active hydrodewaxing catalyst.

The four steps in this procedure, deep exchange, dry air calcination, exposure to moisture and dry roasting (preferably in $H_2$) will substantially reduce the crystallinity of Zeolite Y.

Of the five catalysts tested only catalyst D was prepared in the manner described herein and it was the only one seen to be an effective dewaxing catalyst. Each of the other catalysts was unsatisfactory because at least one of the prescribed steps was not followed.

CATALYST PREPARATION

Catalysts A to E were derived from the same commercial batch of Zeolite Y from Union Carbide Corporation. The "as received" anhydrous composition was

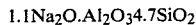

The preparation of catalysts A to D began by refluxing the Na form zeolite Y in a 10:1 volume excess of $NH_4NO_3$ solution at the solution concentrations and for the number of times indicated below for each specific catalyst sample. All samples were washed free of $NO_3^-$ and reslurried in a 3 volume excess of deonized water. In each case $NH_4OH$ was added until the slurry was pH 10 then about 0.15 wt.% volume of solution of Pd $(NH_3)Cl_2$ was added over a five hour period to give a nominal loading of 0.25 wt.% Pd. The products were filtered, dried at 120° C., allowed to equilibrate in laboratory air at room temperature, then pressed and screened into 7-14 mesh Tyler particles.

$SiO_2/Al_2O_3$ ratios were unchanged by these treatments. The "dry air" used when catalysts were air calcined contained no more than 50 ppm $H_2O$. Air calcination here refers to a process of heating in air at temperature exceeding 120° C.

Catalyst A (Na/Al=0.23 No Air Calcination)

Catalyst A was exchanged twice with 2.0 mol dm$^{-3}$ $NH_4NO_3$ yielding a product with Na/Al=0.23. 40 cc of the Pd loaded form of this catalyst was dried in air at 120° C. for one hour then placed into the reactor and reduced in $H_2$ at up to 450° C. for one hour. The used catalyst was judged to be 80% crystalline by XRD.

Catalyst B (Na/Al=0.45; Air Calcined at 500° C.)

Catalyst B was exchanged once with 0.5 mol dm$^{-3}$ $NH_4NO_3$ yielding a product with Na/Al=0.45. 100 cc of the Pd loaded $NH_4^+$ form of this catalyst was heated in dry air in a 1 ft$^3$ muffle furnace at 500° C. for two hours at a dry air flow rate of 3 ft$^3$ h$^{-1}$. The sample was cooled in moist laboratory air to room temperature, placed into the reactor and reduced at up to 400° C. in dry $H_2$ for 1 hour.

The used catalyst was judged to be 80% crystalline by XRD.

Catalyst C (Na/Al=0.23; Air Calcined at 200° C.)

Catalyst C was exchanged twice with 2.0 mol. dm$^{-3}$ $NH_4NO_3$ yielding a product with Na/Al=0.23.

40 cc of the Pd loaded $NH_4$ form of this catalyst was heated in dry air in a 1 ft$^3$ muffle furnace at 200° C. for one hour at a dry air flow rate of 3 ft$^3$ h$^{-1}$. The sample was cooled in moist laboratory air to room temperature, placed into the reactor and reduced in dry $H_2$ at up to 450° C. for 1 hour.

The used catalyst was judged to be 50% crystalline by XRD.

Catalyst D (Na/Al=0.23; Air Calcined at 450° C.)

Catalyst D was exchanged twice with 2.0 mol. dm$^{-3}$ $NH_4NO_3$ yielding a product with Na/Al=0.23. The XRD pattern of the Pd loaded $NH_4^+$ form of this catalyst is shown in FIG. 1A. The sharpness of the diffraction peaks and the absence of a base line halo suggest that this material is highly crystalline at this point.

40 cc of the Pd loaded $NH_4^+$ form catalyst was heated in dry air in a 1 ft$^3$ muffle furnace at 450° C. for one hour at a dry air flow rate of 3 ft$^3$ h$^{-1}$ then withdrawn hot from the furnace into room air and cooled to room temperature. FIG. 1B shows that the zeolite has suffered some crystallinity loss (~50%) during this step. Finally, the catalyst was placed into a reactor and reduced in dry $H_2$ at up to 450° C. for 1 hour. The XRD pattern of the used catalyst after 30h on oil is shown in FIG. 1C. There are now no diffraction peaks that could be associated with the zeolite structure and a large background halo centered at $2\theta=24°$ is evidence of material that is amorphous or has only short range order (very low crystallinity).

Catalyst E (Na/Al=0.23 Treated in 1 mol dm$^{-3}$ $HNO_3$)

Catalyst E was also exchanged twice with 2.0 mol dm$^{-3}$ $NH_4NO_3$ yielding a product with Na/Al=0.23. Following this step the $NH_4^+$ form of the catalyst was soaked for one hour in a 5 volume excess of a 1.0 mol dm$^{-3}$ solution of $HNO_3$ at room temperature. Crystallinity was substantially reduced, to about 15% (by XRD) by this acid leaching.

This material was subsequently exchanged with Pd $(NH_3)_4Cl_2$ to give a nominal loading of 0.25% Pd, then dried at 120° C. for 1 hour.

Following this, the catalyst was placed in the reactor and reduced in dry $H_2$ at up to 450° C.

The used catalyst was judged to have XRD crystallinity of about 10%.

Performance of the Catalysts

Table 2 is a summary of the properties of catalysts A to E, the activation procedures used in their preparation, and their performance as hydrocracking catalysts on 600N raffinate (Western Canadian).

Catalyst A

The catalyst was inactive. Even at severe operating conditions (370° C.) there was little overall conversion, the pour point only marginally altered and the wax content in the product was little different from the feed. Although this catalyst had been exchanged (Na/Al=0.23) it was not dry air calcined nor exposed to moisture. Furthermore, the catalyst was still mostly zeolite (80% crystalline) and therefore unsuitable for the purpose of this invention.

Catalyst B

Catalyst B was an active hydrocracking catalyst but did not selectively hydrodewax. The product pour point was not reduced compared with the feedstock pour point and in some instances the pour point actually increased. There is evidence that wax is concentrating in the hydrocracked product rather than being selectively removed.

Catalyst B was calcined in dry air and exposed to moisture but it had not been exchanged deeply enough, only to Na/Al=0.45. Consequently the catalyst did not lose sufficient crytallinity (the used catalyst was still 80% crystalline). This demonstrates that severe air calcination conditions alone are not sufficient to reduce crystallinity to an acceptable level.

Catalyst C

Catalyst C was an active hydrocracking catalyst but the product pour point was observed to be only marginally reduced with respect to the feedstock pour point although some wax was removed.

This catalyst had been exchanged to a low level, Na/Al=0.23 and was air calcined and exposed to moist air. However, the catalyst was relatively ineffective because the air calcination condition was insufficiently severe (temperature of only 200° C.) and the crystallinity of the used catalyst was observed to be still high (50%). This example demonstrates that air calcination of a deeply exchanged sample is not alone sufficient to render the catalyst suitably selective for hydrodewaxing if it does not reduce crystallinity to below 50%.

Catalyst D

Catalyst D was an active hydrodewaxing catalyst at mild conditions. The pour point and wax content of the product were substantially reduced compared to the feedstock, but the overall conversion was not high, which is the mark of a good hydrodewaxing catalyst. Catalyst D had been deeply exchanged (Na/Al=0.23) and air calcined at a high temperature, leading to a very high degree of structural collapse. VLC Y prepared by the above described thermal treatments is an example of the disclosed invention.

Catalyst E

Catalyst E was not very active. There was very little conversion at 350° C. and no observed change in pour point and only a slight change in wax content compared with the feedstock values. This example demonstrates that it is not sufficient to achieve low crystallinity in the catalyst by leaching with acid. Only thermal degradation of structure incurred by the methods described earlier will render a suitably active dewaxing catalyst.

TABLE 2

| CATALYST | FEED | A | | B | | | C | | D | | E |
|---|---|---|---|---|---|---|---|---|---|---|---|
| Na/Al (atom ratio) | — | 0.23 | | .45 | | | 0.23 | | 0.23 | | 0.23 |
| Dry Air Calcination Temperature, °C. (1) | — | — | | 500 | | | 200 | | 450 | | — |
| Dry H$_2$ Calcination Temperature, °C. (dry roasting) | — | 450 | | 400 | | | 450 | | 450 | | 450 |
| % Crystallinity by XRD | — | 80 | | 80 | | | 50 | | 0 | | 10 |
| Time on Stream (hours) | — | 19–22 | 33–36 | 216–232 | 240–264 | 288–296 | 4–7 | 11–14 | 4–7 | 25–28 | 11–14 |
| Reactor Temperature, °C. (2) | — | 350 | 370 | 300 | 325 | 370 | 300 | 325 | 300 | 350 | 350 |
| Average Yield, wt. % (3) | — | 92 | 88 | 80 | 75 | 35 | 78 | 51 | 77 | 66 | 89 |
| Pour Point, °C. | 50 | 48 | 47 | 50 | 50 | 56 | 50 | 48 | 30 | 12 | 50 |
| Wax Content (4) | 17.1 | — | 16.8 | 18.9 | — | — | — | 9.6 | 8.2 | 4.8 | 13.5 |

(1) Catalyst E was not air calcined but soaked in 1.0 mol dm$^{-3}$ HNO$_3$ for 1 hr. at 25° C.
(2) Other conditions: Pressure 4.14 MPag H$_2$; liquid hourly space velocity 1.0, Excess H$_2$ gas rate 37.8 kmol m$^{-3}$
(3) Residual yield of oil after stripping to initial boiling point of feed (390° C.)
(4) Calculated for products filtered at −5° C. from 1:1 MEK/MIBK at 2:1 solvent:oil

Performance of Catalyst D on Wax

In order to determine the predominent mechanism involved in the dewaxing of waxy oils using Catalyst D, a hard (recrystallized) Western Canadian 150N wax (solid point 56°–58° C.) comprising 98.5% wax and 1.5% oil was contacted with the catalyst under conditions similar to those used for hydrodewaxing the Western Canadian 600N oil of the previous Examples. The results are presented in Table 3. This experiment shows that a net amount of 3.0 wt.% of the wax is converted into oil, possibly by an isomerization process.

TABLE 3

Feedstock - Western Canadian 150N Wax
Time on Stream 51–54 hrs.
Reactor Temperature 315° C. (1)

| Product Yields, Wt. % | | |
|---|---|---|
| Residual Wax | 325° C.+ oil (2) | 325° C.− liquid and dry gas |
| 62.5 | 4.5 | 33 |

(1) See footnote 2, Table 2
(2) 325° C. is the initial boiling point of the feed Some isomerization of the hard wax is apparently occuring, but it is clear that the predominant wax conversion process is hydrocracking, at these conditions.

What is claimed is:

1. A hydrocracking process for reducing the pour point and wax content of waxy hydrocarbon oils comprising contacting said waxy hydrocarbon oil under hydrocracking conditions with a very low crystallinity (VLC) metal-containing catalyst made from a large-pore zeolite having a low SiO$_2$/Al$_2$O$_3$ ratio made by the process comprising:
   (a) exchanging more than about 50% of exchangeable cations from said zeolite with a material that produces hydroxyl groups during calcination,
   (b) calcining the exchanged zeolite at a temperature above about 300° C. in a substantially dry atmosphere to reduce crystallinity in said zeolite by at least about 50%, and
   (c) loading a catalytic metal either before or after said calcination.

2. The process of claim 1 wherein said large pore zeolite is selected from the group consisting of zeolite X and zeolite Y.

3. The process of claim 2 wherein said zeolite is exchanged with ammonium cations.

4. The process of claim 3 wherein the waxy hydrocarbon oil is selected from the group consisting of natural and synthetic waxy hydrocarbon oils.

5. The process of claim 4 wherein the waxy hydrocarbon oil is selected from the group consisting of lubricating oils, transformer oils, specialties oils, diesel oil, kerosene, jet fuels.

6. The process of claim 1, 2, 3, 4 or 5 wherein said VLC catalyst contains a catalytically active metal selected from the group consisting of Group IVB, VB, VIB, VIIB, VIII metals, oxides, sulfides and mixtures thereof.

7. The process of claims 1, 2, 3, 4 or 5 wherein said VLC catalyst has 15% or less crystallinity as determined by x-ray diffraction (XRD).

8. The process of claim 7 wherein said VLC catalyst has 10% or less crystallinity as determined by XRD.

9. The process of claim 8 wherein said VLC catalyst has 0–5% crystallinity as determined by XRD.

10. The process of claim 9 wherein said VLC catalyst contains a catalytically active metal selected from the group consisting of Group VIII metals, oxides, sulfides and mixtures thereof.

11. A hydrocracking process for reducing the pour point and wax content of waxy hydrocarbon oils comprising contacting said waxy hydrocarbon oil under hydrocracking conditions with a very low crystallinity (VLC) catalyst made from low $SiO_2/Al_2O_3$ ratio crystalline alumino silicate zeolite, which zeolite is a large pore zeolite which will not itself reduce either the pour point or wax content of waxy hydrocarbon oils, the VLC catalyst being produced by the process comprising the steps of:
   a. exchanging greater than 50% of original cations in the zeolite with cations which subsequently can be thermally decomposed to yield hydroxyl groups;
   b. loading a catalytically active metal onto the cation exchanged zeolite;
   c. drying the cation exchanged zeolite so as to contain no more than an equilibrium amount of moisture;
   d. calcining the dried zeolite in a substantially dry atmosphere at a temperature of at least about 300° C. so as to reduce crystallinity to 50% or less compared with the zeolite starting material.

12. The process of claim 11 wherein the original cations are exchanged with ammonium cations.

13. The process of claim 11 or 12 wherein the zeolite is exchanged with the cation to a level of greater than 60%.

14. The process of claim 13 wherein the zeolite is exchanged with the cation to a level of greater than 70%.

15. The process of claim 14 wherein the calcination atmosphere contains less than 1 psi water vapor partial pressure at the conditions used.

16. The process of claim 15 wherein said VLC catalyst contains a catalytically active metal selected from the group consisting of Group IV B, V B, VI B, VII B, VIII metals, oxides, and sulfides and mixtures thereof.

17. The process of claim 11 wherein the calcination atmosphere contains less than 1 psi water vapor partial pressure at the conditions used.

18. The process of claim 17 wherein the calcination atmosphere contains less than about 0.2 psi water vapor partial pressure at the conditions used.

19. The process of claim 18 wherein the zeolite is calcined in a substantially dry atmosphere at a temperature of from 300° to 600° C. and wherein the atmosphere contains no more than a trace amount of moisture.

20. The process of claim 19 wherein said VLC catalyst contains a catalytically active metal selected from the groups consisting of Group IV B, V B, VI B, VII B, VIII metals, oxides, and sulfides and mixtures thereof.

21. The process of claim 20 wherein said VLC catalyst contains from 0.2 to 1.0 wt. % of a Group VIII metals, oxides, sulfides and mixtures thereof.

22. The process of claim 11 further comprising the step of roasting the calcined material in an inert-nonreactive or reducing atmosphere containing no more than trace amount of moisture, or in a vacuum, at from 600° to 900° C.

23. The process of claim 11 further comprising the steps of exposing the calcined material to moisture upon cooling so as to allow an equilibrium amount of moisture to adsorb into the the material and then roasting the material in an inert-nonreactive or reducing atmosphere containing no more than trace amount of moisture, or in a vacuum, at from 300°–900° C.

24. The process of claim 11, 22 or 23 wherein said VLC catalyst contains a catalytically active metal selected from the group consisting of Group VIII metals, oxides, and sulfides and mixtures thereof.

25. The process of claim 24 wherein said VLC catalyst contains from 0.2 to 1.0 wt.% of Group VIII metals, oxides, sulfides, and mixtures thereof.

26. The process of claim 25 wherein said VLC catalyst contains from 0.2 to 1.0 wt.% Pd, Pt, or Ni as elemental metals, oxides, sulfides and mixtures thereof.

27. The process of claim 26 wherein the roasting is conducted in a hydrogen atmosphere.

28. The process of claim 25 wherein the roasting is conducted in a hydrogen atmosphere.

29. The process of claim 24 wherein the roasting is conducted in a hydrogen atmosphere.

30. The process of claim 14 wherein the calcination atmosphere contains less than 1 psi water vapor partial pressure at the conditions used.

31. The process of claim 30 wherein said VLC catalyst contains a catalytically active metal selected from the group consisting of group IVB, VB, VIIB, VIII metals, oxides, and sulfides and mixtures thereof.

* * * * *